O. A. KENYON.
ELECTRIC ARC WELDING.
APPLICATION FILED MAR. 14, 1918.
1,265,342.
Patented May 7, 1918.
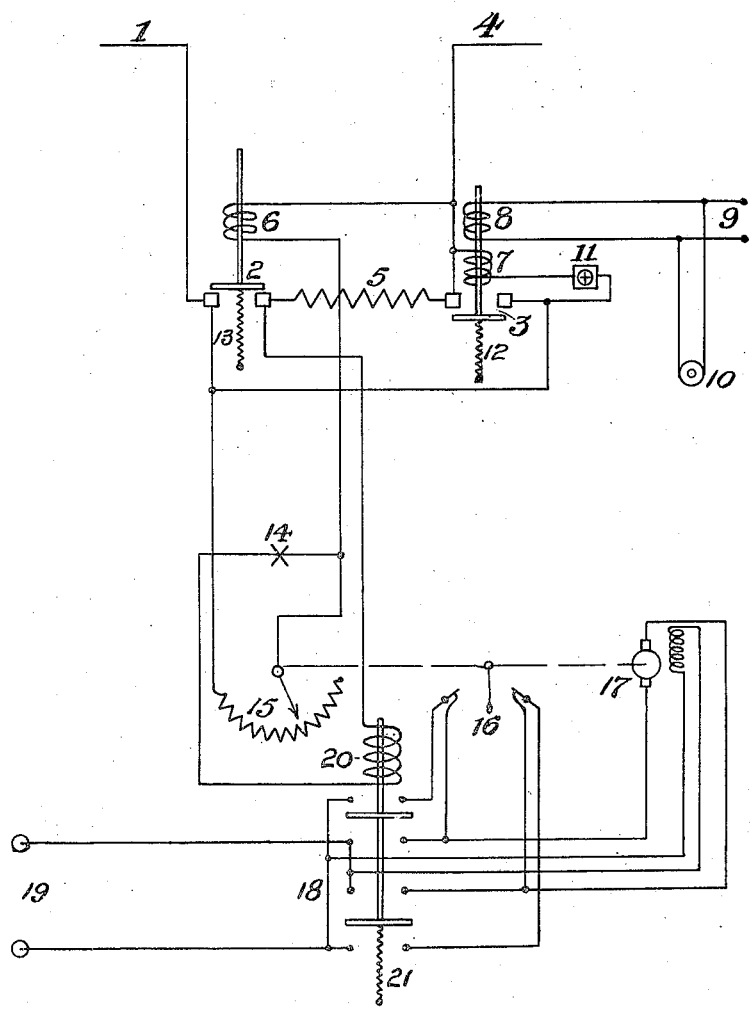
Inventor.
Otis A. Kenyon.
By J. Walter Fowler
Attorney.

UNITED STATES PATENT OFFICE.

OTIS ALLEN KENYON, OF NEW YORK, N. Y.

ELECTRIC-ARC WELDING.

1,265,342.  Specification of Letters Patent.  Patented May 7, 1918.

Application filed March 14, 1918. Serial No. 222,420.

*To all whom it may concern:*

Be it known that I, OTIS A. KENYON, a citizen of the United States, residing at New York city, in the county of New York and State of New York, have invented certain new and useful Improvements in Electric-Arc Welding, of which the following is a specification.

This invention relates to electric arc welding and primarily to an automatic heat controller for reducing the initial welding current to uniform maximum working value, and the invention consists of the parts and the arrangements and combinations of parts which I will hereinafter describe and claim.

In the accompanying drawing forming part of this specification I illustrate one embodiment of mechanism for carrying out the invention, and wherein the figure represents, somewhat diagrammatically, an electric arc system of heat control, hereinafter described.

In the said drawing, 1 and 4 indicate the terminals of the welding line; 2 and 3 are contactors connected to springs 13 and 12 respectively; 5 is a resistor; 6 and 7 are coils; 8 is a holding coil connected to an exciting source, 9, and controlled by the push button, 10. The welding arc is shown at 14 and in parallel with the arc is an adjustable resistor, 15. 17 is a pilot motor of any appropriate character; 18 is a pole-changing switch; 16 represents a limit switch; 20 is a coil of the pole-changer, 18, and 21 is a spring connected to said coil.

In electric arc welding as practised at the present time, the electric arc is not applied with success to very thin sheet metal. This is due almost, if not entirely, to the difficulty of dissipating heat fast enough to prevent burning a hole through the metal before a weld can be accomplished, and even if a weld is finally attained, it is seldom tight.

In arc welding employing a low current and a short arc it is possible to weld thin metals, provided the current regulation of the welding circuit is very close, but the result is far from satisfactory.

It is recognized, that the rate of melting of the electrode or pencil is approximately constant, being a function of the current, and therefore if there is sufficient heat to penetrate the cold metal at the start and to cause complete fusion at the joint, there will be too much heat a few seconds later when the metal has absorbed a considerable quantity of heat, and by the time the metal comes to its normal working temperature, the arc will be producing heat so much faster than it can be dissipated, that a hole will be burned through the metal.

The heat produced in the arc is proportional to the product of the current and the voltage. However, the temperature of the metal is not determined by any such simple relation. The temperature of the metal depends upon the quantity of metal into which the heat is put and the quantity of metal depends upon the current almost entirely. The excess heat put into the metal after it has been melted varies with the voltage. Therefore, it is the current which determines the flow of metal and the depth of penetration in the weld, while the E. M. F. determines the excess heat put into the metal after it is melted, and in this way also has an effect upon the penetration into the weld.

In order to take these phenomena into account and so control them that satisfactory results will be obtained, I have devised means whereby the rate of heat production and flow of metal can be varied to suit the requirements of the work.

In the figure I show one embodiment of this invention, although I do not limit myself to this particular arrangement, but intend that the invention shall comprehend and include other arrangements coming within the scope of the appended claims. Referring to the figure, the main welding circuit enters the controller at 1 and leaves at 4. Under normal conditions the contactors, 2 and 3, are closed, the contactor, 2, being closed by the action of the spring, 13, and the contactor, 3, being closed by the holding coil, 8, which is separately excited from the source, 9.

The welding arc is connected across the welding line terminals, substantially as shown, and in parallel with the arc is an adjustable resistor, 15, operated by the pilot motor, 17, and pole changing switch, 18, of any desired character.

In order to start the welding operation, the push button, 10, is closed, short-circuiting coil, 8, and allowing the spring, 12, to open the contactor, 3. This places the resistor, 5, directly across the terminals of the welding line. The arc, 14, is connected across the terminals of the resistor, 5, and therefore a voltage equal to the drop through the resistor is available for starting the arc.

In order to start the arc, current is drawn through the coil, 6, which opens the contactor, 2, and disconnects the resistor, 5, from the circuit and leaves the arc, 14, alone in the circuit. In parallel with the arc are the coils 7 of the contactor, 3, and the coil, 20, of the pole changer, 18. The closing of the pole changer switch starts the motor, 17, and reduces the resistance, 15, in parallel with the arc, and in this way shunts the current around the arc. When the arc has been reduced to a sufficiently low value for normal operation, the rotation of the contact is stopped by a limit switch, 16, which leaves the arm in a stationary position until the arc is extinguished, when the spring, 21, reverses the pole changer and starts the arc in an opposite direction. Drawing too long an arc will put sufficient current through the coil, 7, and closing the contactor, 3 and thus by connecting a low resistance path in parallel with the arc, will kill said arc.

In operation, the arrangement of parts results in starting the arc with a maximum current, and reducing it at a definite rate to a definite value, and restoring the starting value upon cessation of the arc at a definite rate. Therefore, if the arc is interrupted only momentarily, it will start again at practically the same current at which it was interrupted.

From the foregoing it will be understood that the essential feature of the present invention is in providing automatic means for decreasing the current at a definite rate to a definite value after the arc is started, and then returning the current to starting value at a definite rate, said means being actuated by the arc itself.

Having thus described my invention what I claim as new and desire to secure by Letters Patent is:—

1. In electric arc welding, a welding arc and means for starting the arc with a maximum current and then automatically reducing the current.

2. In electric arc welding, a welding arc and means for starting the arc with a maximum current and then automatically reducing the current to a definite value.

3. In electric arc welding, a welding arc and means for starting the arc with a maximum current and then automatically reducing the current at a definite rate to a definite value.

4. In electric arc welding, a welding arc and means for starting the arc with a maximum current, then automatically reducing the current and restoring the value of the starting current upon cessation of the arc.

5. In electric arc welding, a welding arc and means for starting the arc with a maximum current, then automatically reducing the current, and upon the cessation of the arc restoring the value of the starting current at a definite rate.

6. In electric arc welding, a welding arc and means for starting the arc with a maximum current, then automatically reducing the current at a definite rate to a definite value and upon the cessation of the arc restoring the value of the starting current at a definite rate.

In testimony whereof I affix my signature.

OTIS ALLEN KENYON.